United States Patent
Ichikawa et al.

(10) Patent No.: US 7,200,409 B1
(45) Date of Patent: Apr. 3, 2007

(54) ON-BOARD COMMUNICATION TERMINAL AND INFORMATION SERVICE CENTER COMMUNICATING WITH ON-BOARD COMMUNICATION TERMINAL

(75) Inventors: Yukio Ichikawa, Kanagawa (JP); Masaru Mizuno, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 309 days.

(21) Appl. No.: 09/889,086

(22) PCT Filed: Nov. 10, 2000

(86) PCT No.: PCT/JP00/07964

§ 371 (c)(1),
(2), (4) Date: Jul. 11, 2001

(87) PCT Pub. No.: WO01/37240

PCT Pub. Date: May 25, 2001

(30) Foreign Application Priority Data

Nov. 12, 1999 (JP) ................................. 11-322941

(51) Int. Cl.
*H04Q 7/20* (2006.01)
(52) U.S. Cl. ................ 455/456.1; 455/556.1; 455/426.1
(58) Field of Classification Search ............. 455/426.1, 455/557, 556.1, 345, 346, 404.1, 404.2, 521, 455/456.1; 340/902, 903, 935, 936, 989, 340/991, 425.5, 426.1, 429, 426.11, 426.15; 379/37, 38, 39, 48; 701/2, 124, 92
See application file for complete search history.

(56) References Cited

U.S. PATENT DOCUMENTS 5,223,844 A * 6/1993 Mansell et al. ........ 342/357.07
5,311,197 A * 5/1994 Sorden et al. ............... 342/457

(Continued)

FOREIGN PATENT DOCUMENTS

| DE | 44 21 508 A | 12/1994 |
|---|---|---|
| DE | 197 55 075 A1 | 6/1999 |
| JP | 6-18648 | 1/1994 |

(Continued)

*Primary Examiner*—Jean Gelin
*Assistant Examiner*—Sam Bhattacharya
(74) *Attorney, Agent, or Firm*—Pearne & Gordon LLP (57) ABSTRACT

The invention provides an on-vehicle communication terminal that secures a report to a center and safety of a crew by providing short-range radio communication means in the on-vehicle communication terminal, separately configuring a mobile terminal provided with a part of the functions of a conventional on-vehicle terminal detached therefrom, and letting the crew who are escaping carry a mobile terminal.

That is, an on-vehicle terminal (1) according to the invention includes location information detecting means (11), state sensor (14) for detecting an abnormal state and outputting the state information, first radio communication means (12) for transmitting predetermined data including state information, location information on a plurality of locations and a terminal ID to the information service center (2) on occurrence of a predetermined event, and second radio communication means (16) for providing radio communications between the on-vehicle terminal (1) and the mobile terminal (3). The mobile terminal (3) includes second radio communication means (31) and further location information detecting means (11) and a state sensor (14). Thus, by configuring an on-vehicle communication terminal with a combination of the on-vehicle terminal (1) and the mobile terminal (3), the crew can report to the information service center (2) while securing safety in the event of an accident.

9 Claims, 10 Drawing Sheets

U.S. PATENT DOCUMENTS

| | | | | |
|---|---|---|---|---|
| 5,572,204 | A | * | 11/1996 | Timm et al. ................. 340/988 |
| 5,764,736 | A | * | 6/1998 | Shachar et al. .......... 379/93.09 |
| 5,808,564 | A | * | 9/1998 | Simms et al. ................ 340/990 |
| 5,914,675 | A | * | 6/1999 | Tognazzini ................. 340/989 |
| 6,298,306 | B1 | * | 10/2001 | Suarez et al. ................ 701/213 |
| 6,519,463 | B2 | * | 2/2003 | Tendler ................... 455/456.3 |

FOREIGN PATENT DOCUMENTS

| | | |
|---|---|---|
| JP | 10-96765 | 4/1998 |
| JP | 11-220775 | 8/1999 |
| JP | 11-312285 | * 11/1999 |
| JP | 11 312285 A | 11/1999 |

* cited by examiner

ON-BOARD COMMUNICATION TERMINAL AND INFORMATION SERVICE CENTER COMMUNICATING WITH ON-BOARD COMMUNICATION TERMINAL

TECHNICAL FIELD

The present invention relates to an on-vehicle communication terminal and an information service center to communicate with the on-vehicle communication terminal. In particular, the present invention relates to an on-vehicle terminal for transmitting location information in making emergency report and to an information service center for obtaining the location of the on-vehicle terminal on receiving the location information and performing emergency services.

BACKGROUND OF THE INVENTION

A terminal equipment including a mobile phone equipped with a location information detecting function such as the GPS, and also having state detecting means such as an automatic or manual emergency sensor or abnormality sensor is getting more compact and a cost therefore is getting lowered with the progress in the current technologies. Further, reliability on impact resistance and the like has been improved. Such a terminal is mounted on a vehicle to provide an emergency report system for traffic accidents and implemented in pendant format to provide a man location system for those who have chronic diseases such as a heart attack.

An on-vehicle terminal mounted on a vehicle will be described among the aforementioned terminals. Such an on-vehicle terminal acquires location information every fixed time or every fixed distance with a system to detect location information such as the GPS, and memorizes path information of a plurality of locations (points) when the terminal is moving. In the related art, when the status of the on-vehicle terminal itself was changed or was requested by an information service center (hereinafter referred to as a center), the on-vehicle terminal transmits the path information of the past several points just before transmitting to the center by using a predetermined communication protocol. On the other hand, on receiving the travel path information, the center plots the path information over a digital map displayed on an operator console with superimposing it to check the travel history of a vehicle mounting an on-vehicle terminal.

Figure 8:
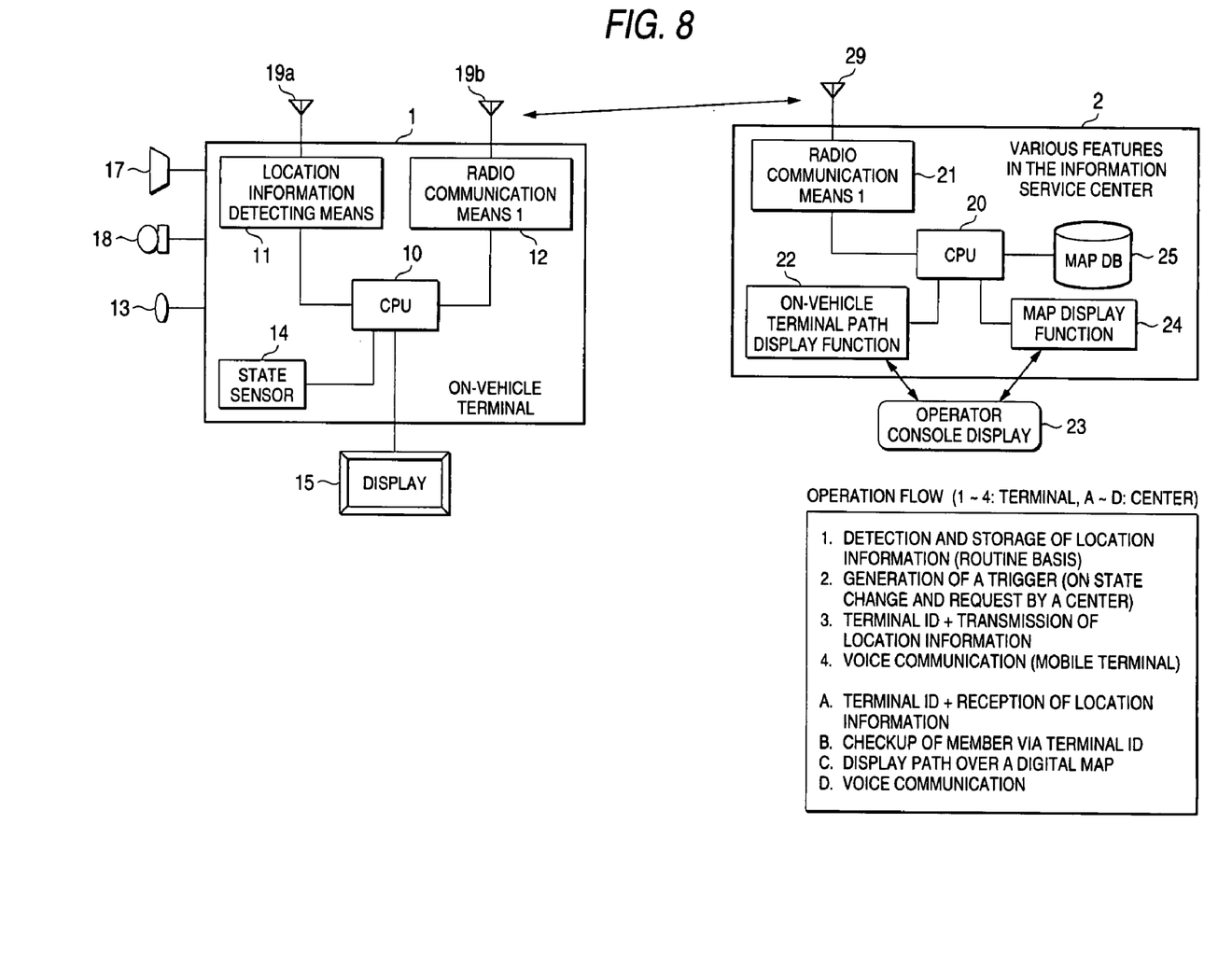
FIG. 8 is a block diagram of an on-vehicle terminal and an information service center according to the conventional art.

FIG. 8 shows the configuration of an on-vehicle terminal and a service center according to the conventional art. An on-vehicle terminal 1 is composed of location information detecting means 11 for obtaining location information by using the GPS; first radio communication means 12 for transmitting location information etc. by radio to an information service center 2 via an antenna 19b; a CPU 10 for controlling the location information detecting means 11 and on-vehicle terminal path display function means 22, a display 15 for displaying the operating state of the on-vehicle terminal 1 and the report to the crew, an emergency button 13 for manually starting an emergency report in an emergency, and a state sensor 14 for automatically detecting an abnormal state such as an accident or sudden illness and starting an emergency report.

The information service center 2 is composed of a first radio communication means 21 for receiving the location information transmitted from the on-vehicle terminal 1 via an antenna 29; an on-vehicle terminal path is display function 22 for displaying the path of the on-vehicle terminal 1 on an operator console 23 according to the location information; a map display function 24 for extracting map data including the moving path of the on-vehicle terminal from a map database (hereinafter referred as the map DB) 25 and displaying the map data on the operator console 23; a CPU 20 for controlling the on-vehicle terminal path display function means 22; and the operator console display 23 for displaying the moving path of the on-vehicle terminal 1 over the map with superposing the path.

Performance of the on-vehicle terminal 1 and the service center 2 configured according to the above conventional art will be described with FIG. 8. The on-vehicle terminal 1 uses the location information detecting means 11 to detect location information. The on-vehicle terminal 1, on automatic or manual detection of an abnormal state, originates a trigger to start emergency report operation. Further, the on-vehicle terminal 1 adds a terminal ID to the location information to generate transmittal information and transmits this information from the first radio communication means 12 toward the first radio communication means 21 of the information service center.

The center 2 receives location information and a terminal ID from the on-vehicle terminal 1 by using the first radio communication means 21. The center 2 checks on that the owner of the on-vehicle terminal 1 is a member who has a right to get services from the center 2 with the terminal ID. The center 2 creates path data from the received location information and displays the path data on the digital map with superposing them.

Figure 9:
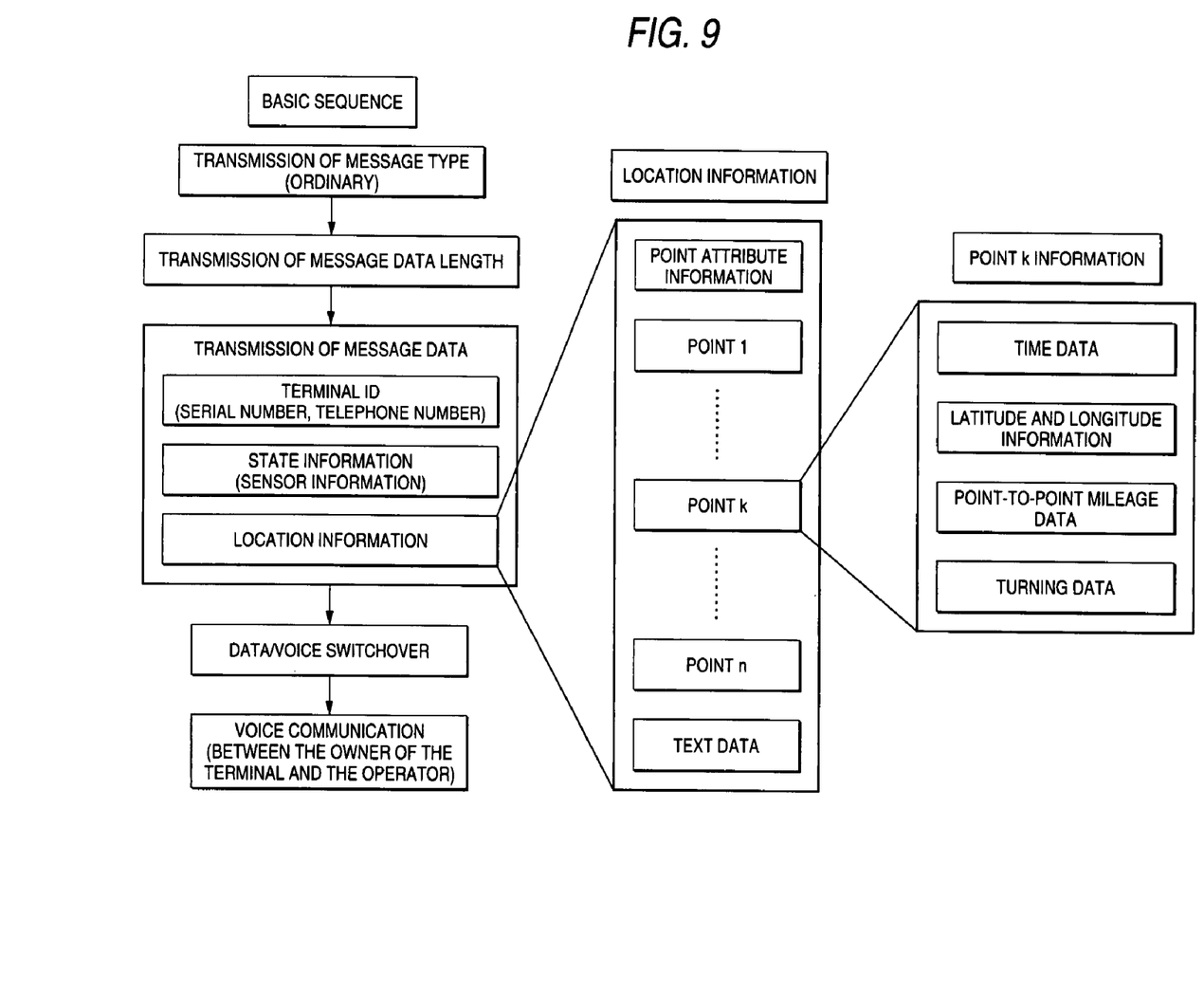
FIG. 9 shows the communication procedure followed by an on-vehicle terminal and an information service center according to the conventional art.
Figure 10:
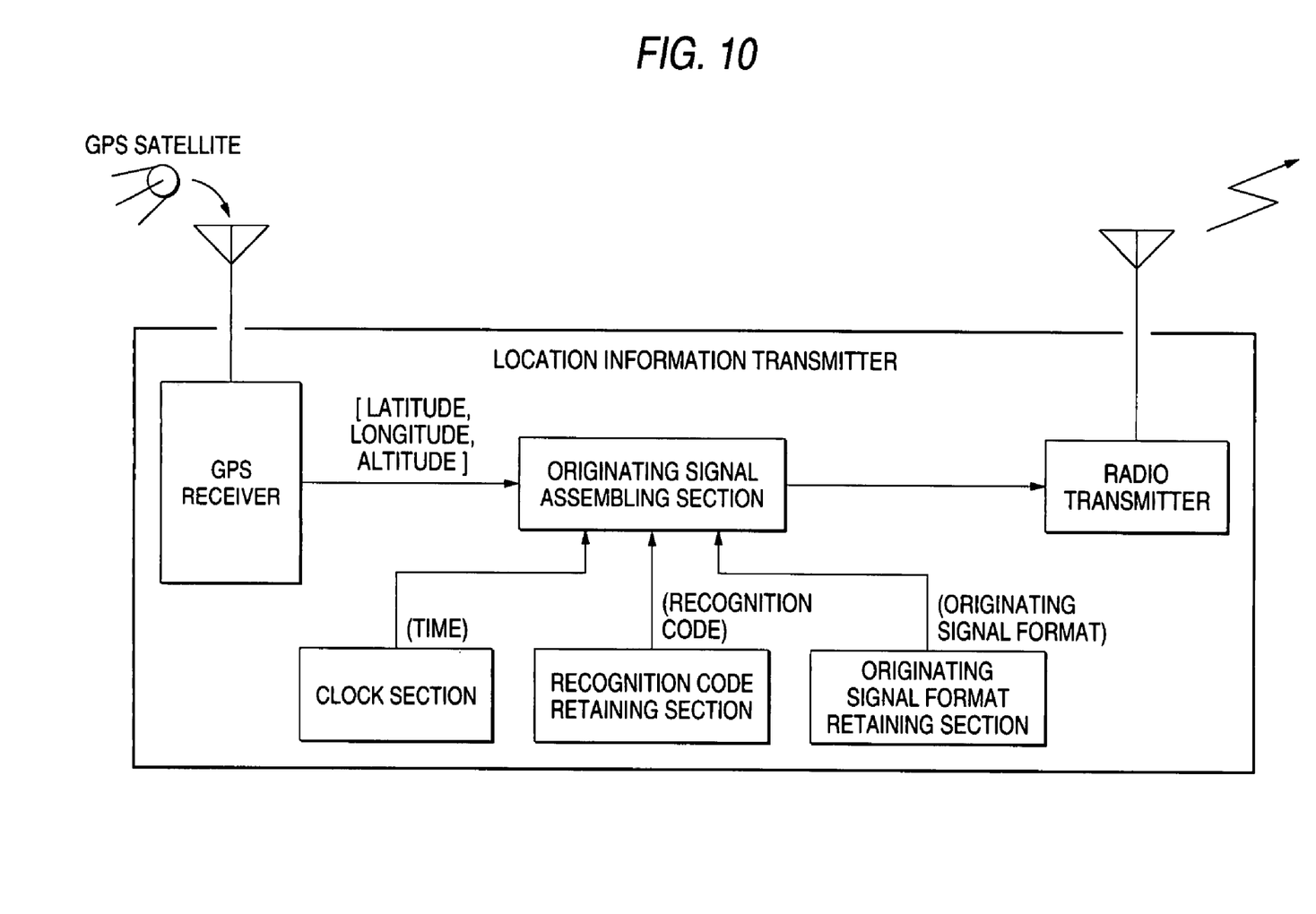
FIG. 10 is a block diagram of location information transmitter according to the conventional art.

FIG. 9 shows the details of the conventional communication procedure. In FIG. 9, the basic sequence is the overall processing procedure. The location information shows the format of transmission data and composed of point attribute information, data on points 1 through n, and text data. The point k information among the sent data shown in FIG. 9 shows details of the point k. Detailed point information consists of time data, latitude/longitude information, point-to-point mileage data, and turning data.

The conventional communication procedure will be described in FIG. 9. First, a message type indicating the type of data, basic data or extended data, is transmitted as the basic sequence. Next, the length of message data is transmitted. Then, the body of message data is transmitted.

The body of message data is composed of a terminal ID consisting of a serial number and telephone number, state information consisting of sensor information, and location information. When the body of message data has been transmitted, data communications are switched to voice communications and voice conversation is made between the crew and the operator in the center.

A conventional example of such an on-vehicle terminal is a location information transmitter disclosed in the Japanese Patent Laid-Open No. 18648/1994. This apparatus is a location information transmitter that aims at automatically outputting correct location information via simple manipulation and that acquires location information via GPS satellites to output radio waves.

An on-vehicle terminal according to the conventional art measures the current location of the vehicle, and obtains the location information consisting of the latitude, longitude and altitude by using the GPS satellites. The on-vehicle terminal assembles the location information, origination start time and recognition code into an origination signal according to the origination signal format. The on-vehicle terminal outputs the location information of the originating party with radio wave by modulating the high-frequency carrier with the origination signal.

Assume an exemplary application to a system where a conventional on-vehicle terminal is mounted on a vehicle and the location information on the vehicle is reported to the center in an emergency such as a traffic accident. When a traffic accident takes place, the crew should escape from the vehicle without delay to secure safety against a secondary disaster, according to the manual for traffic rules. Accordingly, there is a problem that it is impossible to report to the center from a vehicle involved in an accident.

DISCLOSURE OF THE INVENTION

The objects of the present invention are to solve the above problems and to provide an on-vehicle communication terminal that assures report to the center as well as safety of the crew by including short-range radio communication means in the on-vehicle terminal and separately configuring a mobile terminal having a part of the functions of the conventional on-vehicle terminal in order for the escaping crew to carry the mobile terminal. It is a more specific object of the present invention is to provide an on-vehicle communication terminal capable of detecting the path information and state variance information on the crew who have escaped from the vehicle via the mobile terminal and report the information to the information service center. A still further object of the present invention is to provide an information center equipped with means for distinguishing between information transmitted from the on-vehicle terminal and the information transmitted from the mobile terminal in case the on-vehicle communication terminal reports to the center.

The invention according to claim 1 of the present invention provides an on-vehicle communication terminal including an on-vehicle terminal having location information detecting means, state sensor means for detecting an abnormal state and outputting the state information, means for recording predetermined location information including time information and latitude/longitude information at each point in the location information obtained by the location information detecting means, and radio communication means for transmitting predetermined data including state information, location information and a terminal ID to the information service center on occurrence of a predetermined event, and a mobile terminal equipped with second radio communication means which is a separable part of the functions of the on-vehicle terminal detached therefrom, wherein, when the on-vehicle terminal has switched to the voice mode after completion of data transmission, the mobile terminal in the close proximity of the on-vehicle terminal uses the second radio communication means to perform voice communications with the information service center via the on-vehicle terminal. Owing to this configuration, it is possible to secure a report to the center and safety of the crew by letting the crew who are escaping carry a mobile terminal.

The invention according to claim 2 of the present invention provides the on-vehicle communication terminal according to claim 1, wherein the mobile terminal further includes a function of location information detecting means. Owing to this configuration, it is possible to trace the location of the crew who have escaped from the vehicle.

The invention according to claim 3 of the present invention provides an on-vehicle communication terminal according to claim 1, wherein the on-vehicle communication terminal further includes state sensor means as a function of the mobile terminal. Owing to this configuration, it is possible to monitor the state change of the crew who have escaped from the vehicle.

The invention according to claim 4 provides an on-vehicle communication terminal according to claim 1, wherein the on-vehicle communication terminal further includes location information detecting means and state sensor means as functions of the mobile terminal. Owing to this configuration, it is possible to keep tracing the location of the crew and monitoring the state change of them after they have escaped from the vehicle.

The invention according to claim 5 of the present invention provides an on-vehicle communication terminal according to claim 1, wherein the on-vehicle communication terminal further includes means for detecting the relative distance between the on-vehicle terminal and the mobile terminal, and the a main terminal for communications at the on-vehicle communication terminal is switched over. Owing to this configuration, it is possible to constantly follow the mobile terminal by switching over the a main terminal for communications at the on-vehicle communication terminal.

The invention according to claim 6 of the present invention provides an information service center wherein the information service center comprises means for distinguishing information between the information transmitted from the on-vehicle terminal and the information transmitted from the mobile terminal when the service center receives and restores information transmitted from a plurality of types of on-vehicle communication terminals according to one of claim 1 through claim 5 to location information on each point by using a predetermined communication protocol. Owing to this configuration, it is possible to distinguish between information on the vehicle and information on the crew. Thus it is possible for the center to make safer judgement on the crew who have escaped from the vehicle in the event of an accident or a sudden illness.

The invention according to claim 7 of the present invention provides an on-vehicle communication terminal including location information detecting means, state sensor means for detecting an abnormal state and outputting the state information, means for recording predetermined location information having time information and latitude/longitude information at each point in the location information obtained by the location information detecting means, an on-vehicle terminal equipped with first radio communication means for transmitting predetermined data having state information, location information and a terminal ID to the information service center on occurrence of a predetermined event, and a mobile terminal equipped with second radio communication means provided with a part of the functions of the on-vehicle terminal detached therefrom, wherein the mobile terminal is provided with data retaining means for temporarily storing data, the data retaining means storing the predetermined data updated as required while the vehicle is traveling. Owing to this configuration, it is possible to reliably take the information to be transmitted to the information service center out of the vehicle by letting the escaping crew carry a mobile terminal. It is thus possible to secure a variety of data in an accident even in case the on-vehicle terminal has been burned down together with the vehicle and help determine the cause of the accident as well as secure the safety of the crew.

An on-vehicle communication terminal according to a further preferable configuration of the invention includes a configuration in which higher-priority emergency information data to be transmitted to the information service center is stored to the data retaining means and it is possible to take out the emergency information data of the vehicle together with the mobile terminal by storing the emergency information data in the data retaining means in the event of an emergency. Owing to this configuration, it is possible to provide a mobile terminal that secures various data in an accident while reducing the data volume to be taken out of the vehicle in an accident, thus helping determine the cause of the accident, the mobile terminal seldom going faulty with a simple structure.

An on-vehicle communication terminal according to a further preferable configuration of the invention has a configuration where the on-vehicle communication terminal, after transmitting the emergency information data to the information service center, makes voice communications with the information service center. Owing to this configuration, it is possible for the center to recognize the distant party via data transmission from the mobile terminal even in case the data in the on-vehicle terminal is corrupted, thus securing report to the center.

An on-vehicle communication terminal according to a further preferable configuration of the invention has a configuration where communications from the mobile terminal to the service center are made via communication apparatus different from the on-vehicle terminal associated with the mobile terminal, the communication apparatus existing in the close proximity of the mobile communication terminal. Owing to this configuration, it is possible to reliably report to the center from a nearby substitute communication terminal even in case the associated on-vehicle terminal has failed in communications.

In the figures, a numeral 1 designates an on-vehicle terminal, 2 a information service center, 3 a mobile terminal, 10, 20, 30 a CPU, 11 location information detecting means, 12, 21 first radio communication means, 13 an emergency button, 14 a state sensor, 15, 32 a display, 16, 31 second radio communication means, 22 on-vehicle path display function, 23 an operator console display, 24 a map display function, 25 a map database, and 41 data retaining means.

BEST MODE FOR CARRYING OUT THE INVENTION

Embodiments of the invention will be described referring to the drawings.

First Embodiment

Figure 1:
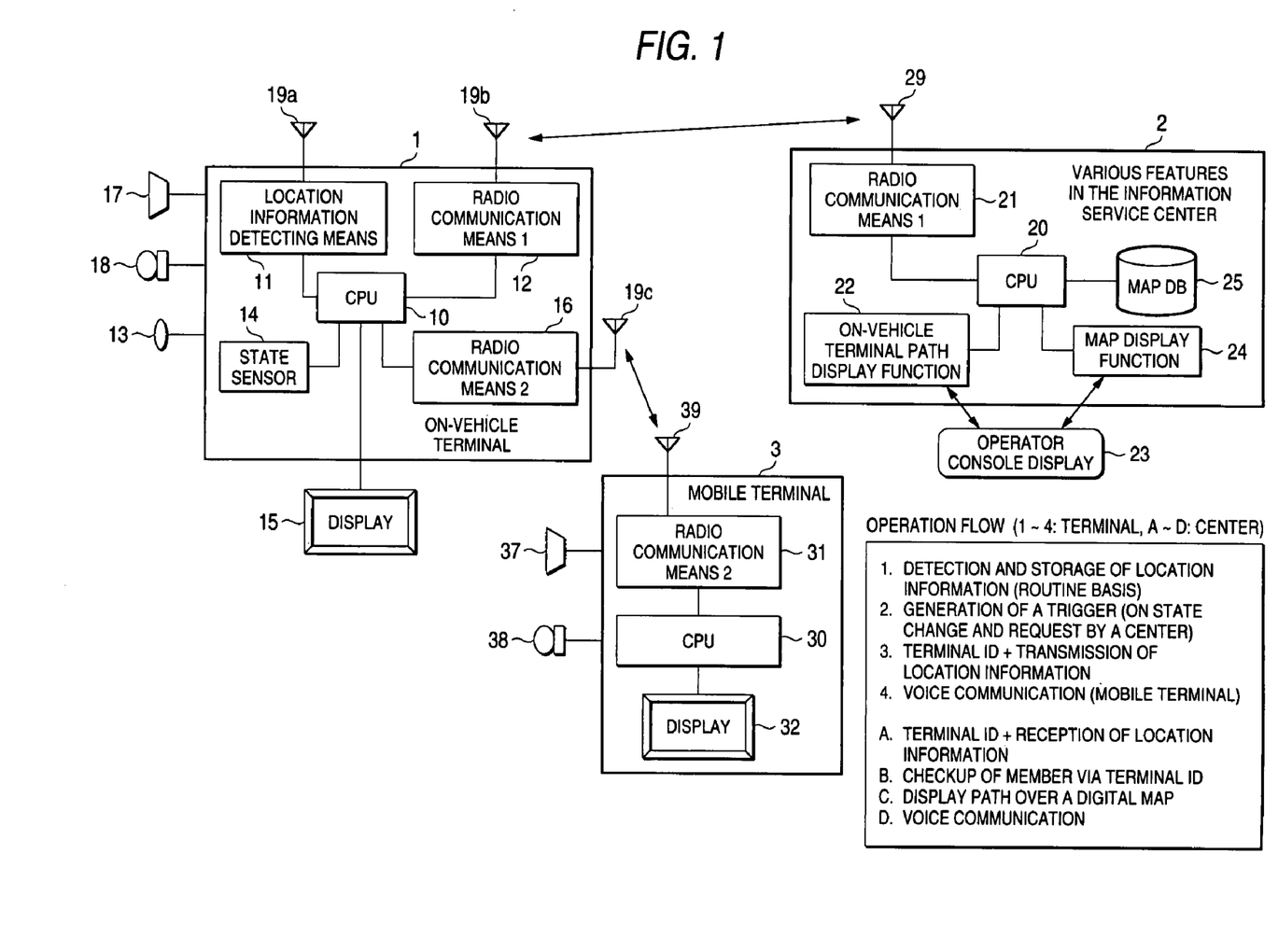
FIG. 1 is a block diagram of an on-vehicle terminal, a mobile terminal and an information service center according to the embodiment of claim 1 of the present invention.

FIG. 1 is a block diagram of an on-vehicle communication terminal and an information service center according to claim 1. The on-vehicle communication terminal is composed of an on-vehicle terminal 1 and a mobile terminal 3. The on-vehicle terminal 1 is associated with the mobile terminal 3.

In FIG. 1, the on-vehicle terminal 1 includes location information detecting means 11 for obtaining location information by using the GPS and others; first radio communication means 12 for transmitting location information by radio to a center 2, an emergency button 13 for manually starting an emergency report in an emergency, a state sensor 14 for automatically detecting an abnormal state such as an accident or sudden illness and starting an emergency report; second radio communication means 16; a display 15 for displaying the operating state of the on-vehicle terminal 1 and a report to the crew; location information detecting means 11; and a control function unit (hereinafter referred to as the CPU) 10 for controlling the radio communication means.

The mobile terminal 3 includes second radio communication means 31; a display 32 for displaying the operating state of the mobile terminal 3 and the report to the crew; and a CPU 30 for controlling radio communication means. The first radio communication means 12 of the on-vehicle terminal 1 communicates with first radio communication means 21 in the center 2. The second radio communication means 31 of the on-vehicle terminal 1 communicates with the second radio communication means 31 in the mobile terminal 3.

The information service center 2 includes the first radio communication means 21 for receiving location information transmitted from the on-vehicle terminal 1; an on-vehicle terminal path display function 22 for displaying the path of the on-vehicle terminal 1 on an operator console 23 based on the location information; an operator console display 23 for displaying the travel path of the on-vehicle terminal 1 and state information on a map; a map display function 24 for extracting map data including the travel path of the on-vehicle terminal from a map database 25 and displaying the map data on the operator console 23; and a CPU 20 for controlling the on-vehicle terminal path display function means 22 and radio communication means.

Figure 2:
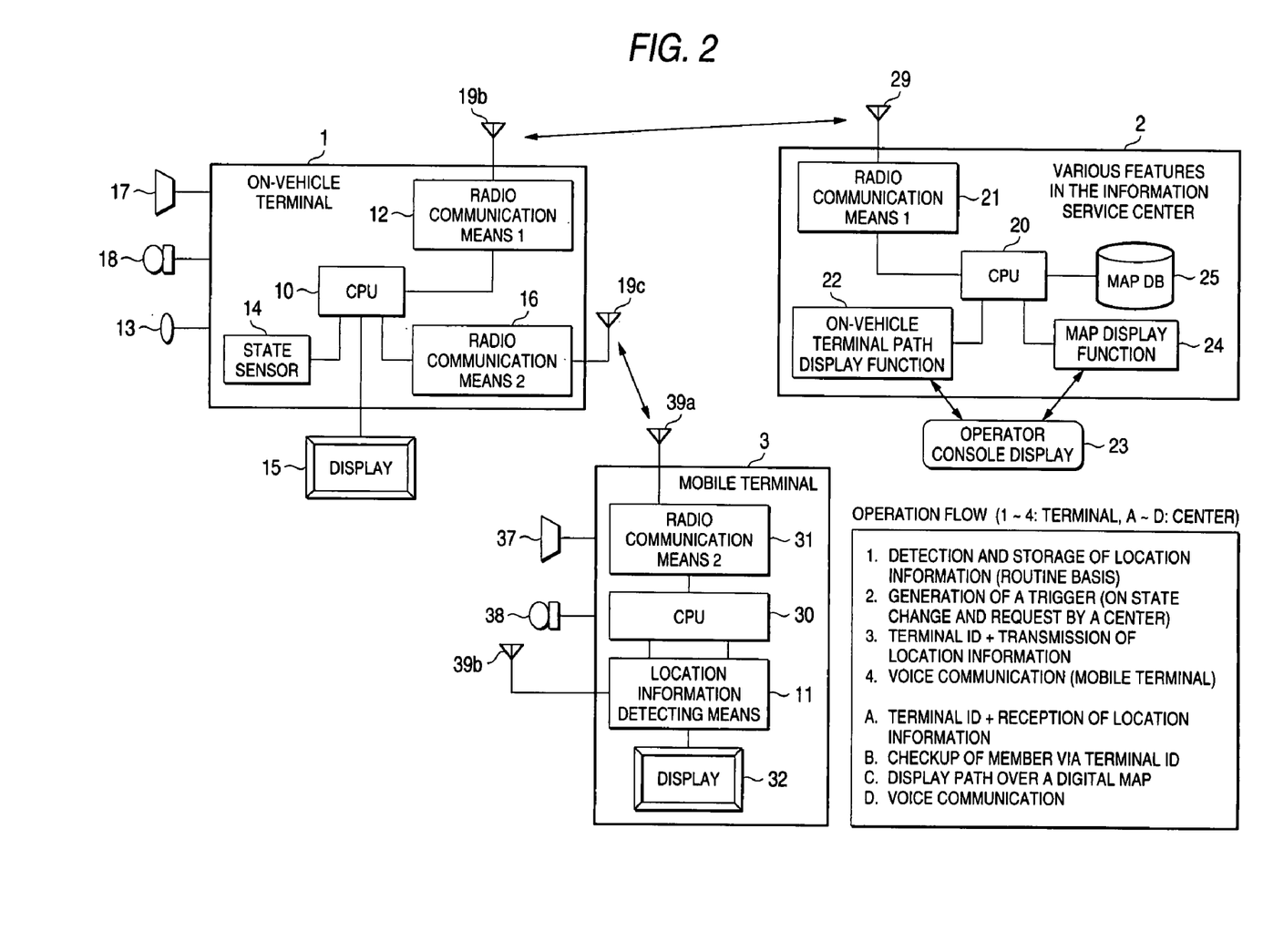
FIG. 2 is a block diagram of an on-vehicle terminal, a mobile terminal and an information service center according to the embodiment of claim 2 of the present invention.

FIG. 2 is a block diagram of an on-vehicle communication terminal and an information service center according to claim 2. The on-vehicle communication terminal is composed of an on-vehicle terminal 1 and a mobile terminal 3. The on-vehicle terminal 1 is associated with the mobile terminal 3.

FIG. 2 is the same as FIG. 1 except that the location information detecting means 11 is placed in the mobile terminal 3 instead of the on-vehicle terminal 1. As a result, it is possible to trace the travel path of the crew when the crew carrying the mobile terminal 3 escape in an emergency.

Figure 3:
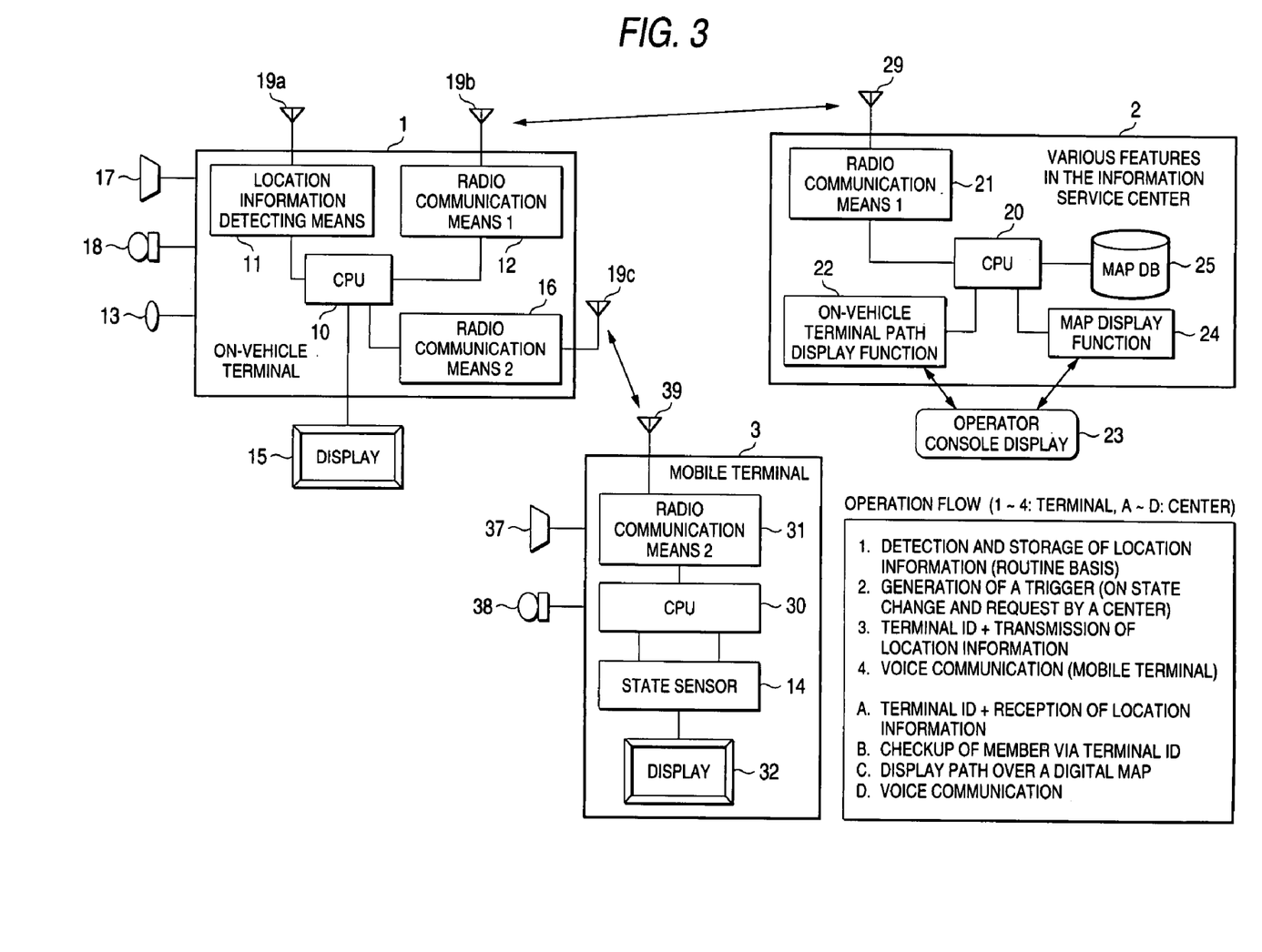
FIG. 3 is a block diagram of an on-vehicle terminal, a mobile terminal and an information service center according to the embodiment of claim 3 of the present invention.

FIG. 3 is a block diagram of an on-vehicle communication terminal and an information service center according to claim 3. The on-vehicle communication terminal is composed of an on-vehicle terminal 1 and a mobile terminal 3. The on-vehicle terminal 1 is associated with the mobile terminal 3.

FIG. 3 is the same as FIG. 1 except that the state sensor 14 is placed in the mobile terminal 3 instead of the on-vehicle terminal 1. As a result, it is possible to monitor the state change of the crew when the crew carrying the mobile terminal 3 escape in an emergency.

Figure 4:
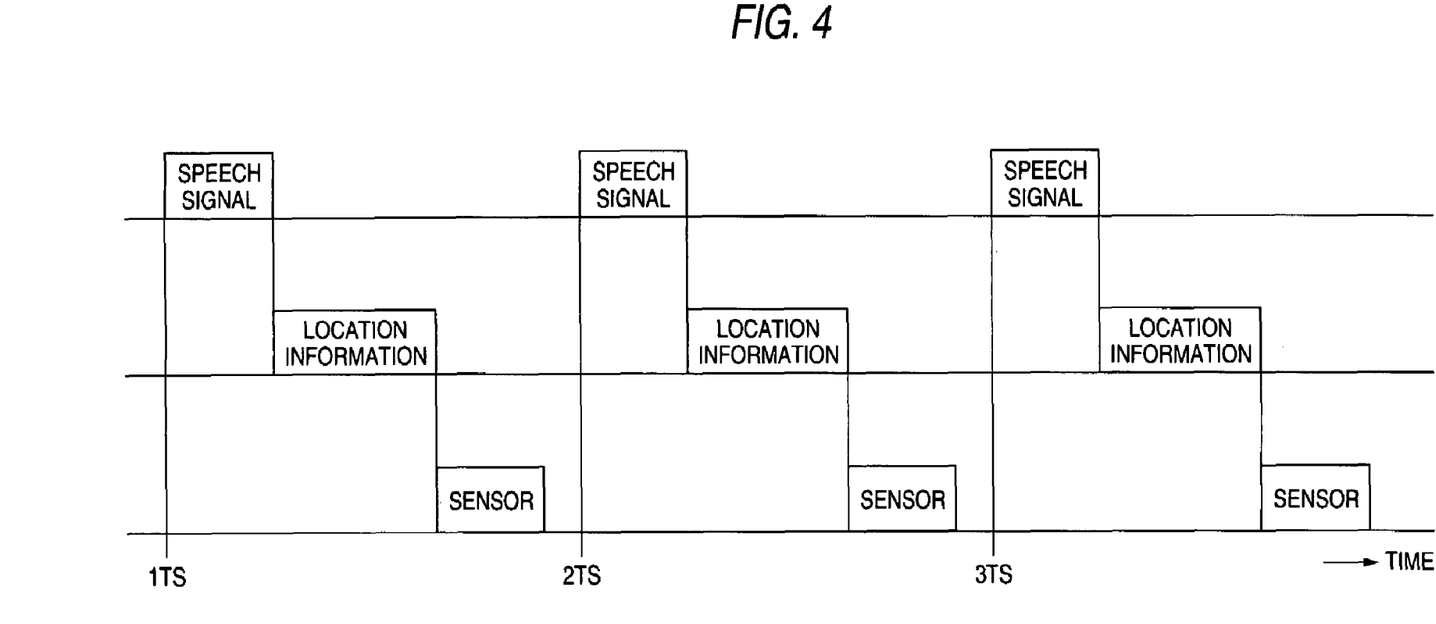
FIG. 4 shows an example of output timing of various information in a mobile terminal according to an embodiment of the invention.
Figure 5:
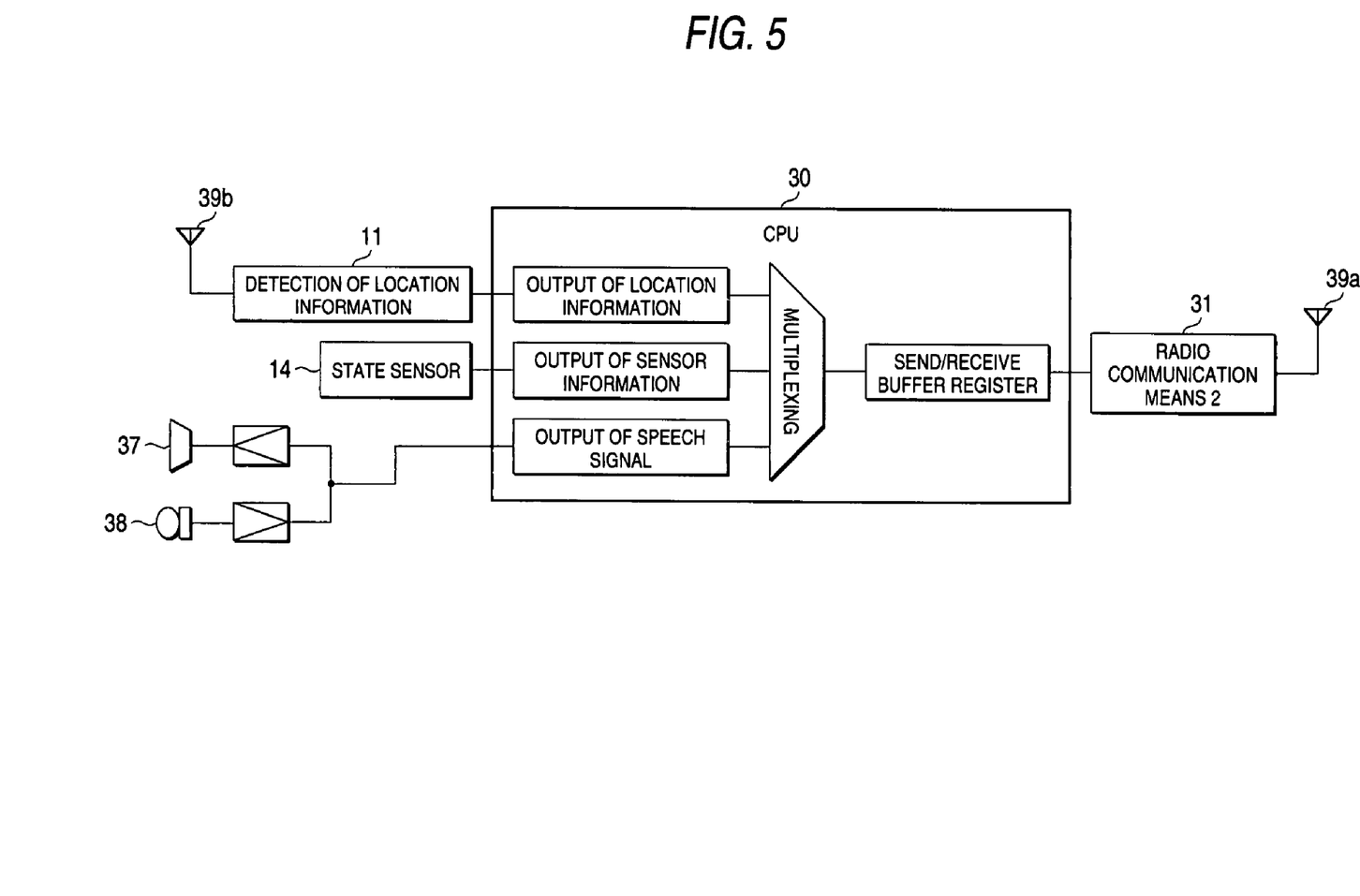
FIG. 5 shows an example of data processing method in a mobile terminal according to an embodiment of the invention.

FIG. 4 shows an example of output timing of various information assumed in the case where communication are made between the on-vehicle terminal 1 and the mobile terminal 3 using the second radio communication means 16 according to an embodiment of the invention. FIG. 5 shows an example of data processing method in a mobile terminal according to an embodiment of the invention.

Operation of the on-vehicle communication terminal according to an embodiment of the invention thus configured will be described. First, general operation flow of the entire system will be described referring to FIG. 1. In the on-vehicle terminal 1, location information is detected by the location information detecting means 11 per predetermined distance, predetermined time or predetermined turning angle, or per combination thereof each time the on-vehicle terminal 1 travels. Then the location information is cyclically stored in a ring buffer (not shown). Information to be stored contains time data, latitude/longitude information on each point, mileage data from the preceding point, and the turning angle from the preceding point.

The on-vehicle terminal 1 generates a trigger to start emergency report operation on detecting an abnormal state or request by the center 2. The on-vehicle terminal 1 adds a terminal ID to location information stored in the ring buffer (not shown) to build send information, and transmits the resulting information to the center 2 via the first radio communication means 12 according to a predetermined communication protocol.

The center 2 receives location information and a terminal ID from the on-vehicle terminal 1 via the first radio communication means 21. The center 2 uses the received terminal ID to check that the owner of the on-vehicle terminal 1 is a member eligible for the services from the center 2, and displays the travel path of the on-vehicle terminal 1 with superposing the digital map displayed on the operator console.

As mentioned earlier, the on-vehicle terminal 1, after completion of data transmission to the center 2, enters the voice mode. The mobile terminal 3 can make voice communications with the operator in the center 2 via the second radio communication means 31 and the second radio communication means 16 in the on-vehicle terminal 1. The second radio communication means 16 is typically compact and lightweight and uses a small-power radio wave that allows short-range communications of some tens of meters. The Bluetooth system that has recently attracted people's attention is optimum for the invention. It is possible to use other short-range radio communication systems.

Figure 6:
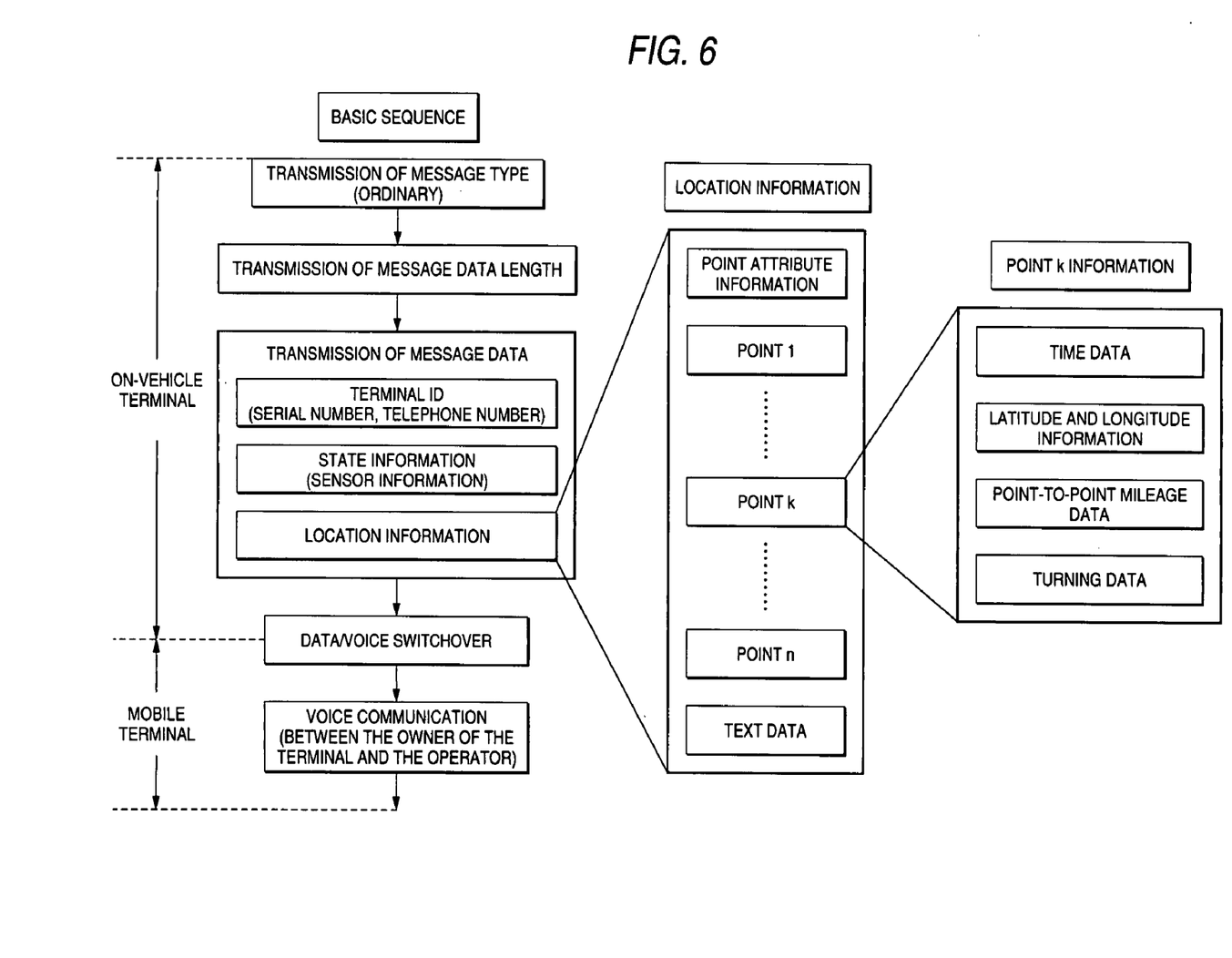
FIG. 6 shows the communication procedure followed by an on-vehicle terminal and an information service center according to the embodiment of claim 1 of the present invention.

Next, the communication procedure according to claim 1 will be described referring to FIG. 6. As shown in FIG. 6, in the initial stage of the operation, the communication party at the on-vehicle communication terminal is on-vehicle terminal 1. In this state, the on-vehicle terminal 1 transmits the message type to represent the basic type or extended type at the beginning of the basic sequence.

The on-vehicle terminal 1 then transmits the message data length and the message data body. The message data body is composed of state information consisting of a serial number, a terminal ID such as a telephone number and sensor information, and location information. With transmission of the message data body complete, the communication party at the on-vehicle communication terminal is switched over from the on-vehicle terminal 1 to the mobile terminal 3 when the communication mode changes from data communication mode to voice communication mode. This allows the crew carrying the mobile terminal 3 who have escaped from the vehicle to make voice communication with the operator in the center 2.

Communication procedure according to claim 2 through claim 4 will be described referring to FIG. 4. FIG. 4 shows an example of output timing of various information in a mobile terminal assumed in the case where second radio communications are made between the on-vehicle terminal 1 and the mobile terminal 3. While the embodiment according to claim 1 assumes voice communication after finishing data communication, it is possible to multiplex location information and state sensor information from the mobile terminal 3 into a speech signal for transmission in claim 2 through the claim 4.

For example, assuming that the digital voice transmission rate is 64 kbps, a single time slot (hereinafter notified as 1TS) is 1 ms, and baseband transmission rate of the second radio communication means is 128 kbps, the speech signal occupies a space of 64 bits within 1TS. Thus it is possible to carry information as long as 64 bits (corresponding to 64 kbps). Thus, as shown in FIG. 4, it is possible to multiplex location information and state sensor information in the remaining time period in each TS. This approach is supported by the aforementioned Bluetooth system whose baseband transmission rate is 1 Mbps. This approach is also applicable in other short-range radio communication systems where the baseband transmission rate is sufficient for multiplexing.

FIG. 5 shows an example of data processing method in a mobile terminal 3 in the multiplex communication. In FIG. 5, signals from location information detecting means 11 such as the GPS, state sensor means 14, a loudspeaker 37 and a microphone 38 undergo location information output processing, sensor information output processing and speech signal output processing respectively and then multiplexing. The signals pass through a send/receive buffer register and second radio communication means 31 and are transmitted to the on-vehicle terminal 1 via an antenna 39*a*.

As shown in FIG. 2, according to claim 2, the mobile terminal 3 is equipped with the location information detecting means 11 so that only the location information is multiplexed. As shown in FIG. 3, according to claim 3, the mobile terminal 3 is equipped with the state sensor 14 so that only the state sensor information is multiplexed.

While communications are made by the on-vehicle terminal 1 in the data communication mode and by the mobile terminal 3 in the voice communication mode according to claim 1 through claim 4 as shown in FIG. 6, it is possible to transmit/receive a speech signal information and sensor information from the start of communication in both data communications and voice communications.

While radio wave intensity from the mobile terminal 3 is monitored by using the second radio communication means 16 in the on-vehicle terminal 1 in order to detect the relative distance between the on-vehicle terminal 1 and the mobile terminal 3 and the communication party is typically set to the on-vehicle terminal 1 according to claim 5 as shown in FIGS. 1 through 3, it is possible to switch over the communication party to the mobile terminal 3 when the radio wave intensity has dropped below a predetermined value.

As a result, even in case the crew have escaped from the vehicle immediately after the accident, the communication party always traces the crew carrying the mobile terminal 3. This implements a safer system.

In FIGS. 2 and 3, the location information detecting means 11 and the state sensor 14 are illustrated assuming a combination of the on-vehicle terminal 1 and the mobile terminal 3 constitutes a single unit. However, it is preferable that the location information detecting means is separately provided in the on-vehicle terminal and the mobile terminal, since the antenna installation conditions have considerable effects on the characteristics of the location information detecting means. Also, the state sensor is preferably provided separately since the detecting conditions of the emergency sensor and accident sensor differ between the vehicle and the crew.

According to claim 6, it is possible to distinguish between information transmitted from the on-vehicle terminal and information transmitted from the mobile terminal by analyzing the location information and state sensor information transmitted from the plurality of types of on-vehicle communication terminals. This is easily accomplished by providing the header section of particular information with source identification information.

Second Embodiment

Figure 7:
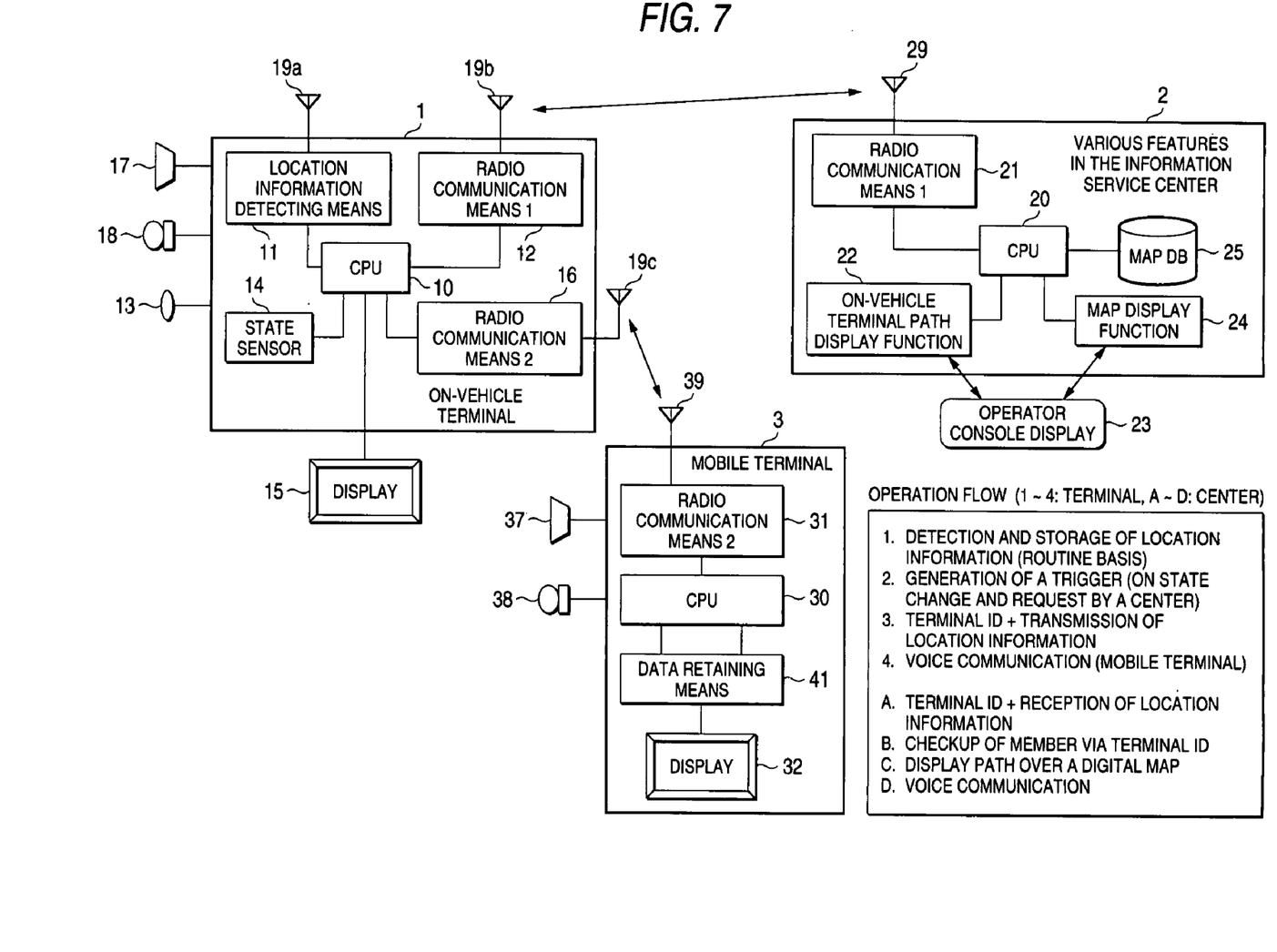
FIG. 7 is a block diagram of an on-vehicle terminal, a mobile terminal and an information service center according to the embodiment of claim 7 of the present invention.

FIG. 7 is a block diagram of an on-vehicle communication terminal and an information service center according to the embodiment of claim 7 through claim 10. The on-vehicle communication terminal is composed of an on-vehicle terminal 1 and a mobile terminal 3. The on-vehicle terminal 1 is associated with the mobile terminal 3.

FIG. 7 is the same as FIG. 1 except that data retaining means 41 is additionally provided in the mobile terminal 3. As a result, it is possible to store data in the data retaining means 41 for recognizing the on-vehicle terminal such as a terminal ID and higher-priority emergency information data to be transmitted to the center 2 in an emergency, to transmit information stored in the data retaining means in communications with the center 2, and to enjoy services such as voice communication after the center 2 has checked that the data sender is a member eligible for the services. It is also possible to additionally store data necessary for communications via a similar on-vehicle terminal mounted on a separate vehicle and a repeater installed in the close proximity of the accident site, as well as via the on-vehicle terminal 3 mounted on the same vehicle as the mobile terminal 3, and expand the communication range of the mobile terminal by using such data. Further, even in case communications are impossible, the data in the event of an emergency is retained in the mobile terminal, which can be used for later analysis of the cause of the accident.

Operation of the on-vehicle communication terminal according to the second embodiment thus configured will be described. First, general operation flow of the entire system will be described referring to FIG. 7. In the on-vehicle terminal 1, location information is detected by the location information detecting means 11 per predetermined range, predetermined time or predetermined turning angle, or per combination thereof each time the on-vehicle terminal 1 travels. Then the location information is cyclically stored in a ring buffer (not shown). Information to be stored contains time data, latitude/longitude information on each point, mileage data from the preceding point, and the turning angle from the preceding point. In this practice, the location information stored in the ring buffer (not shown) in the on-vehicle terminal 1 is simultaneously stored into the data retaining means 41 consisting of memory provided in the mobile terminal 3. Location data stored then is preferably same as the data to be stored into the ring buffer and should contain the location data representing the final location. State information consisting of sensor information may be added. On top of the location information and state information, higher-priority emergency information data to be transmitted to the information service center in an emergency is also stored into the data retaining means 41. As a result, it is possible to take out higher-priority emergency information data to be transmitted to the information service center by letting the crew carry the mobile terminal 3 when escaping out of the vehicle in an emergency. The emergency information data contains a terminal ID, a vehicle ID (serial number, manufacturer's name), a subscriber ID (member number, originating number of a portable telephone set to which the subscriber registers), location information (location data representing the location in the event of an emergency), time information, and accident information (state sensor information indicating whether the air bag worked and whether the manual button was manipulated). The location information may be the same as that stored in the ring buffer in the on-vehicle terminal, as mentioned earlier. It is possible to store the aforementioned whole message data body into the data retaining means 41. Thus it is possible to transmit the message data body from the mobile terminal 3 to the center 2 via the communication procedure shown in FIG. 6 in order to make communications with the center 2.

The on-vehicle communication terminal according to the invention supports the following situations that may take place when the crew carrying the mobile terminal 3 have successfully escaped from the vehicle:

(1) The vehicle has gone up in flames after the crew have escaped, thus disabling the on-vehicle terminal 1.

(2) The on-vehicle terminal 1 is in original shape but the message data body consisting of state information and location information to be transmitted from the on-vehicle terminal 1 to the center 2 has corrupted due to the impact of the accident so that the center 2 cannot obtain necessary information.

(3) The first radio communication means 12 or the second radio communication means 16 has failed. Communication with the center 2 via the on-vehicle terminal mounted on the vehicle is disabled.

In each of these cases, it is assumed that the emergency report to the center 2 immediately after the accident has not started. In such a case, an emergency report to the center 2 has not been made even when the crew carrying the mobile terminal 3 have escaped out of the vehicle.

However, in the on-vehicle communication terminal according to the second embodiment, the mobile terminal 3 is equipped with data retaining means 41. It is thus possible to reliably take the information to be transmitted to the information service center out of the vehicle by letting the escaping crew carry the mobile terminal 3. The mobile terminal 3 can perform emergency report operation again by the following operation after the crew have escaped.

The mobile terminal 3 generates a trigger via manipulation by the crew carrying the mobile terminal 3 to perform emergency report operation again. The mobile terminal 3 adds a terminal ID to location information stored in the data retaining means 41 to build information to be sent, and tries communications with the on-vehicle terminal 1 associated via the second radio communication means 31 provided in the mobile terminal 3 according to a predetermined communication protocol. In case the communications are successful, the mobile terminal 3 undergoes the operation flow and communication procedure shown in FIGS. 1 and 6. The mobile terminal then completes data transmission to the center 2, enters the voice mode. Now the mobile terminal 3 can make voice communications with the operator in the center 2 via the second radio communication means 31 and the second radio communication means 12 in the on-vehicle terminal 1.

In case the on-vehicle terminal 1 is totally disabled, communications are made with a repeater provided on the roadside in the close proximity of the accident site or another on-vehicle terminal mounted on another vehicle according to a respective communication protocol. The repeater provided on the roadside may be a roadside machine used for narrow area communications (called DSRC) covering a narrow area used for roadside-to-vehicle communications such as the ETC (Electronic Toll Collection) system or commercial car management system. The DSRC is a type of short-range radio communications and its communication range is several meters to several tens of meters. In this case, the second radio communication means 31 of the mobile terminal 3 can preferably make narrow-area communications with the roadside machine. The roadside machine may be used with a repeater supporting the Bluetooth-based communication in order to relay communications with the center 2. In case DSRC is used as second communication means from the beginning, the roadside machine can do without a repeater. In case communications are made with another on-vehicle terminal mounted on another vehicle, it is possible for the center 2 to identify the data transmission from a source other than the associated terminal, by providing originating source information in the header section of the information from the on-vehicle terminal 3. In this case, the mobile terminal can transmit location information stored in the data retaining means 41 in the mobile terminal 3 as location information to be transmitted as well as transmit location information in another on-vehicle terminal currently in use to the center, since communications are made with the center via another on-vehicle terminal mounted on another vehicle. Accordingly, more accurate location information can be transmitted.

The mobile terminal retains predetermined data including a terminal ID and location information necessary for establishing communications with the center 2. Thus the mobile terminal 3 alone can make communications to the center 2 to secure an emergency report.

As mentioned earlier, according to an on-vehicle communication terminal of the present invention, various data in the event of an accident is retained in the mobile terminal 3 even when the on-vehicle terminal 1 is disabled. This helps determine the cause of the accident in the conduct of the accident, as well as secure the safety of the crew. It is possible to provide a mobile terminal that secures various data in an accident while reducing the data volume to be taken out of the vehicle in an accident, thus helping determine the cause of the accident, the mobile terminal seldom going faulty with a simple structure. It is possible for the center to recognize the originating party via data communications from the mobile terminal even in case the data in the mobile terminal has corrupted, thus securing a report to the center.

It is possible to report to the center via a substitute communication terminal in the close proximity even when the associated on-vehicle terminal has been disabled.

To summarize the foregoing description, an on-vehicle communication terminal according to the embodiments of the present invention is an on-vehicle communication terminal for transmitting data including state information, location information and a terminal ID to the information service center, for switching to the voice mode, and for making voice communications with the operator in the information service center, wherein the on-vehicle terminal function is detached using the short-range radio communications and a mobile terminal is provided anew for the crew to carry in escaping from the vehicle in an emergency, in order to secure both safety of the crew and emergency contact.

INDUSTRIAL APPLICABILITY

As understood from the foregoing description, the present invention has an excellent effect of securing both contact with the information service center and safety of the crew, by providing second radio communication means and separately configuring a mobile terminal having functions of voice communication, location information detection, state sensor detection, and data retention in order to let the crew escaping from the vehicle carry the mobile terminal in a traffic accident. Further, it is possible to detect travel information and state change information of the crew off the vehicle and report such information to the information service center by using the mobile terminal.

By separately providing short-range, low-radio-power second radio communication means, the mobile terminal itself attains a lightweight and compact design which is very convenient for the crew to carry along.

Further, it is possible to select a combination of a loudspeaker and a microphone apart from the loudspeaker and the microphone specific to the vehicle by detaching the voice communication function. This provides an effect that the characteristics of voice from the crew to the emergency service center are better than that from the on-vehicle terminal to the center.

The invention claimed is:

1. An on-vehicle communication system including first radio communication means for transmitting predetermined data having state information in the detection of an abnormal state, the predetermined location information and a terminal ID to an information service center on occurrence of a predetermined event, said on-vehicle communication system comprising:

an on-vehicle terminal main unit having the first radio communication means to communicate with the information service center;

a mobile terminal detachable from said on-vehicle terminal main unit, and means for detecting a relative distance between said on-vehicle terminal main unit and said mobile terminal, wherein said means switches a main system for communications of said on-vehicle communication system, wherein said mobile terminal includes voice communication means, wherein said on-vehicle terminal main unit and said mobile terminal can communicate with each other via second radio communication means, and wherein if said first radio communication means has finished transmitting the predetermined data to the information service center, said mobile terminal has the second radio communication means transmit data for voice communication to the information service center via said on-vehicle terminal main unit.

2. The on-vehicle communication system according to claim 1, wherein said system further comprises location information detecting means as a function of said mobile terminal.

3. The on-vehicle communication system according to claim 1, wherein said mobile terminal further includes a function of state sensor means.

4. An on-vehicle communication system according to claim 1, wherein said mobile terminal further includes functions of location information detecting means and state sensor means.

5. An on-vehicle communication system including first radio communication means for transmitting predetermined data having state information in the detection of an abnormal state, the predetermined location information and a terminal ID to an information service center on occurrence of a predetermined event, said on-vehicle communication system comprising:
an on-vehicle terminal main unit;
a mobile terminal detachable from said on-vehicle terminal main unit, and
means for detecting a relative distance between said on-vehicle terminal main unit and said mobile terminal, wherein said means switches a main system for communications of said on-vehicle communication system, wherein said mobile terminal includes voice communication means, wherein said on-vehicle terminal main unit and said mobile terminal can communicate with each other via second radio communication means, wherein if said first radio communication means has finished transmitting the predetermined data to the information service center, said mobile terminal has the second radio communication means transmit data for voice communication to the information service center via said on-vehicle terminal main unit, and wherein the information service center includes means for distinguishing whether information is transmitted from said on-vehicle terminal main unit or whether the information is transmitted from said mobile terminal when said service center receives and restores the information transmitted from a plurality of types of on-vehicle communication systems according to a predetermined communication protocol.

6. An on-vehicle communication system including location information detecting means; state sensor means for detecting an abnormal state and outputting state information; means for recording predetermined location information having time information and latitude/longitude information of the location information obtained by the location information detecting means at each point; first radio communication means for transmitting predetermined data having the state information, the predetermined location information and a terminal ID to an information service center on occurrence of a predetermined event; and voice communication means, wherein said on-vehicle communication system comprises an on-vehicle terminal main unit and a mobile terminal detachable from said on-vehicle terminal main unit, and wherein said mobile terminal includes voice communication means and data retaining means for temporarily storing data, and wherein said on-vehicle terminal main unit and said mobile terminal can communicate with each other via second radio communication means, wherein the data retaining means temporarily stores data updated as required while the vehicle is traveling, and wherein the mobile terminal can transmit data stored in the data retaining means to the on-vehicle terminal main unit, which can then transmit the data to the information service center.

7. The on-vehicle communication system according to claim 6, wherein said data retaining means stores higher-priority emergency information data to be transmitted to the information service center, and the emergency information data stored in the data retaining means can be taken out of the vehicle together with said mobile terminal in the event of an emergency.

8. The on-vehicle communication system according to claim 7, wherein said on-vehicle communication system makes voice communication with the information service center after transmitting the emergency information data to the information service center from said mobile terminal.

9. The on-vehicle communication system according to claim 8, wherein communications from said mobile terminal to the service center are made via a communication apparatus different from said on-vehicle communication system associated with said mobile terminal, the communication apparatus existing in the close proximity of said mobile terminal.

\* \* \* \* \*